(12) United States Patent
Erten

(10) Patent No.: US 6,803,738 B2
(45) Date of Patent: Oct. 12, 2004

(54) MAGNETIC ACTUATION AND POSITIONING

(75) Inventor: Gamze Erten, Okemos, MI (US)

(73) Assignee: Clarity, LLC, Troy, MI (US)

(*) Notice: Subject to any disclaimer, the term of this patent is extended or adjusted under 35 U.S.C. 154(b) by 161 days.

(21) Appl. No.: 09/977,039

(22) Filed: Oct. 12, 2001

(65) Prior Publication Data

US 2002/0096956 A1 Jul. 25, 2002

Related U.S. Application Data

(60) Provisional application No. 60/239,910, filed on Oct. 13, 2000.

(51) Int. Cl.$^7$ ................................................ G05B 1/06
(52) U.S. Cl. ....................... 318/653; 318/118; 318/556; 318/680; 310/26; 310/103; 310/156.11; 310/156.36
(58) Field of Search ................................ 318/652–653, 318/680, 686–687, 34–38, 118–121, 135, 492, 552–556; 310/12–14, 26, 31, 34, 40.5, 46, 103, 106, 156.11, 156.12, 156.35, 156.36

(56) References Cited

U.S. PATENT DOCUMENTS

| | | | |
|---|---|---|---|
| 3,548,751 A | 12/1970 | Izhelya et al. | |
| 3,631,808 A | 1/1972 | Moyse | |
| 3,827,371 A | 8/1974 | Onoda | |
| 3,903,808 A | 9/1975 | Foldes | |
| 3,904,898 A | 9/1975 | Mailfert | |
| 3,904,899 A | 9/1975 | Mailfert | |
| RE29,165 E | * 3/1977 | Bode | ............................ 310/46 |
| 4,130,873 A | 12/1978 | Fioretta et al. | |
| 4,240,728 A | * 12/1980 | Wiedmann et al. | ........... 310/14 |
| 4,281,263 A | 7/1981 | Virolleau et al. | |
| 4,390,307 A | 6/1983 | Rice | |
| 4,506,205 A | 3/1985 | Trost et al. | |
| 4,507,597 A | 3/1985 | Trost | |
| 4,535,278 A | 8/1985 | Asakawa | |
| 4,555,650 A | 11/1985 | Asakawa | |
| 4,616,153 A | 10/1986 | Lee | |
| 4,654,571 A | 3/1987 | Hinds | |
| 4,675,582 A | 6/1987 | Hommes et al. | |
| 4,687,054 A | 8/1987 | Russell et al. | |
| 4,694,209 A | 9/1987 | Shindou | |
| 4,721,045 A | 1/1988 | Okawa et al. | |
| 4,737,698 A | 4/1988 | McMullin et al. | |
| 4,739,241 A | 4/1988 | Vachtsevanos et al. | |
| 4,747,668 A | * 5/1988 | Meyer et al. | ................. 310/12 |

(List continued on next page.)

FOREIGN PATENT DOCUMENTS

| | | |
|---|---|---|
| JP | 59-17860 | 1/1984 |
| WO | WO 99/49656 | 9/1999 |

OTHER PUBLICATIONS

Patent Abstracts of Japan Corresponding To 59017860.
ThrustTube Motors, "ThrustBlock Micro Range," 2 pgs, 2001, QM001–AAE.
J. Reinert et al., "Digital control and Optimization of a Rolling Rotor Switched Reluctance Machine," IEEE, vol. 31, No. 2, Mar./Apr. 1995, Abstract.
ThrustTube Motors, "ThrustBlock Range," 2 pgs, 2001, QM0005–AAE.

*Primary Examiner*—Marlon T. Fletcher
(74) *Attorney, Agent, or Firm*—Brooks & Kushman P.C.

(57) ABSTRACT

Magnetic forces are used as a controlled actuation mechanism to move and position objects of interest. In one embodiment, a first spherical surface has at least one magnetic positioner attached. A second spherical surface is positioned to move relative to the first spherical surface. A plurality of controlled electromagnets are spaced about the second spherical surface. Control logic energizes at least one of the controlled electromagnets to create magnetic interaction with at least one magnetic positioner to move the first spherical surface relative to the second spherical surface.

15 Claims, 7 Drawing Sheets

U.S. PATENT DOCUMENTS

| | | | |
|---|---|---|---|
| 4,751,486 A | * 6/1988 | Minato | 310/103 |
| 4,781,286 A | 11/1988 | Weaver | |
| 4,825,111 A | 4/1989 | Hommes et al. | |
| 4,892,467 A | 1/1990 | Crofoot | |
| 5,021,695 A | 6/1991 | Miyazaki et al. | |
| 5,123,818 A | 6/1992 | Gormley et al. | |
| 5,174,215 A | 12/1992 | Barrows | |
| 5,319,577 A | 6/1994 | Lee | |
| 5,398,804 A | 3/1995 | Ecker et al. | |
| 5,402,049 A | 3/1995 | Lee et al. | |
| 5,410,232 A | 4/1995 | Lee | |
| 5,416,392 A | 5/1995 | Lee et al. | |
| 5,449,211 A | 9/1995 | Monford, Jr. | |
| 5,542,762 A | 8/1996 | Nakanishi et al. | |
| 5,627,418 A | 5/1997 | Satomi et al. | |
| 5,666,038 A | 9/1997 | Ohishi | |
| 5,734,209 A | 3/1998 | Hallidy | |
| 5,791,126 A | 8/1998 | Kammler et al. | |
| 5,808,382 A | 9/1998 | Ira et al. | |
| 5,994,798 A | 11/1999 | Chitayat | |
| 6,005,309 A | 12/1999 | Chitayat | |
| 6,061,086 A | 5/2000 | Reimer et al. | |
| 6,144,119 A | 11/2000 | Hazelton | |
| 6,188,149 B1 | 2/2001 | De Jager et al. | |
| 6,208,045 B1 | 3/2001 | Hazelton et al. | |
| 6,236,123 B1 | * 5/2001 | Pinkerton | 310/112 |
| 6,249,065 B1 | * 6/2001 | Oudet et al. | 310/12 |
| 6,259,174 B1 | 7/2001 | Ono | |
| 6,274,952 B1 | 8/2001 | Chitayat | |
| 6,281,644 B1 | 8/2001 | Komatsu et al. | |
| 6,285,097 B1 | 9/2001 | Hazelton et al. | |
| 6,331,744 B1 | * 12/2001 | Chen et al. | 310/171 |

* cited by examiner

MAGNETIC ACTUATION AND POSITIONING

CROSS-REFERENCE TO RELATED APPLICATIONS

This application claims the benefit of U.S. provisional application Ser. No. 60/239,910 filed Oct. 13, 2000, which is incorporated herein by reference in its entirety.

STATEMENT REGARDING FEDERALLY SPONSORED RESEARCH OR DEVELOPMENT

The United States Government may have certain rights in some aspects of the invention claimed herein, as the invention was made with United States Government support under award/contract number DASG60-00-M-0095 issued by the Department of Defense Small Business Innovative Research (SBIR) Program.

BACKGROUND OF THE INVENTION

1. Field of the Invention

This present invention relates to the field of controlled actuation mechanisms. In particular, the present invention relates to the application of controlled magnetic forces as a means of actuating and positioning objects of interest.

2. Background Art

That certain "stones" would attract bits of iron has been well known for centuries. Such materials that have such metal attracting properties are called magnets. A magnet is said to have what is known as magnetic lines of force, invisible to the naked eye but measurable none the less. These lines of force radiate from each end of a bar magnet. Each end is said to be polarized, one being a north (N) pole and the other a south (S) pole. The strength of this magnetic field is dependent on the strength of the magnet. This type of magnet is sometimes called a permanent magnet.

In 1820 Oersted discovered that a current in a wire can also produce magnetic effects, namely, that such current could change the orientation of a compass needle. The magnetic effect of the current through a wire can be intensified by forming the wire into a coil with many turns. The space around the magnet or current carrying wire is defined as the site of a magnetic field. The magnetic effect of current flowing through a coil can be further intensified by providing an iron core inside the coil.

Magnetic actuators take advantage of magnetic effects. Magnetic actuators appear in many forms, including relays, motors, automatic valves, and the like. Magnetic actuation offers the possibility of generating repulsive forces in addition to attractive forces, increasing the flexibility of magnetic actuators.

Current controlled magnetic fields may be used for actuation or positioning of objects. One example is the stepper motor. A stepper motor is an electromechanical device which converts electrical pulses into discrete mechanical movements. The shaft or spindle of a stepper motor rotates in discrete step increments when electrical command pulses are applied in the proper sequence. Motor rotation has several direct relationships to these applied input pulses. The sequence of the applied pulses is directly related to the direction of the motor shaft rotation. The speed of motor shaft rotation is related to the frequency of the input pulses and the length of rotation is directly related to the number of input pulses applied.

One problem with stepper motors is that they provide only one-dimensional rotational positioning due to their cylindrical construction. Many applications require two or three dimensions of rotation. These applications include aiming, such as for cameras, microphones, light sources, and the like. Other applications include positioning devices in space, such as robotic manipulators, probes, and the like. What is needed is to supply multiple degrees of rotation with a single actuator.

SUMMARY OF THE INVENTION

The present invention uses magnetic forces as a controlled actuation mechanism to move and position certain objects of interest.

A magnetic actuation system is provided. The system has a first spherical surface with at least one magnetic positioner attached. A second spherical surface is positioned to move relative to the first spherical surface. A plurality of controlled electromagnets are spaced about the second spherical surface. Control logic energizes at least one of the controlled electromagnets to create magnetic interaction with at least one magnetic positioner to move the first spherical surface relative to the second spherical surface.

In various embodiments of the present invention, each magnetic positioner may be a permanent magnet, an electromagnet, magnetically attracted material, or the like. The spherical surfaces may be concave or convex. Either or both spherical surface may include a flexible printed circuit.

In yet another embodiment of the present invention, a device to be aimed, such as a camera, may be attached to either of the spherical surfaces.

In still another embodiment of the present invention, the spherical surfaces may form a joint for positioning a device such as a robotic manipulator.

In a further embodiment of the present invention, the control logic receives signals from the plurality of controlled electromagnets. Each signal received from one of the controlled electromagnets is generated in response to at least one magnetic positioner moving past the controlled electromagnet. The control logic may use these signals to learn a trajectory of the first spherical surface relative to the second spherical surface.

A method of magnetic actuation for aiming an object is also provided. The object is affixed to a curved surface. The curved surface has at least one attached magnetic positioner. The curved surface is placed in proximity to a second surface. The curved surface is capable of moving in at least two rotational degrees of freedom relative to the second surface. The second surface has a plurality of individually controlled electromagnets arranged in a grid. At least one of the controlled electromagnets is energized to rotatively move the curved surface relative to the second surface to aim the object.

A magnetically aimed camera is also provided. The camera includes a housing having a curved surface and an aperture surface, the aperture surface defining an aperture. An imaging array is disposed within the housing. The imaging array receives light through the aperture. At least one magnetic positioner is disposed within the housing at the curved surface. A socket receives the housing such that the housing curved surface rotates within the socket. A plurality of controlled electromagnets are disposed within the socket for rotating the housing.

In various embodiments of the present invention, control logic operates the aimed camera to implement at least one of vergence movements, vestibulo-ocular movements, optokinetic movements, saccadic movements, and pursuit movements.

A magnetically aimed transducer is also provided. A housing holds the transducer. At least one magnetic positioner is disposed within the housing at a curved surface. A socket receives the housing with the housing curved surface rotating within the socket. The housing is positioned in the socket such that the transducer is aimable through an opening in the socket. A plurality of controlled electromagnets are disposed within the socket. Each controlled electromagnet is controllable to magnetically interact with the at least one magnetic positioner to rotate the housing within the socket, thereby aiming the transducer.

The above objects and other objects, features, and advantages of the present invention are readily apparent from the following detailed description of the best mode for carrying out the invention when taken in connection with the accompanying drawings.

DETAILED DESCRIPTION OF THE PREFERRED EMBODIMENT(S)

Figure 1:
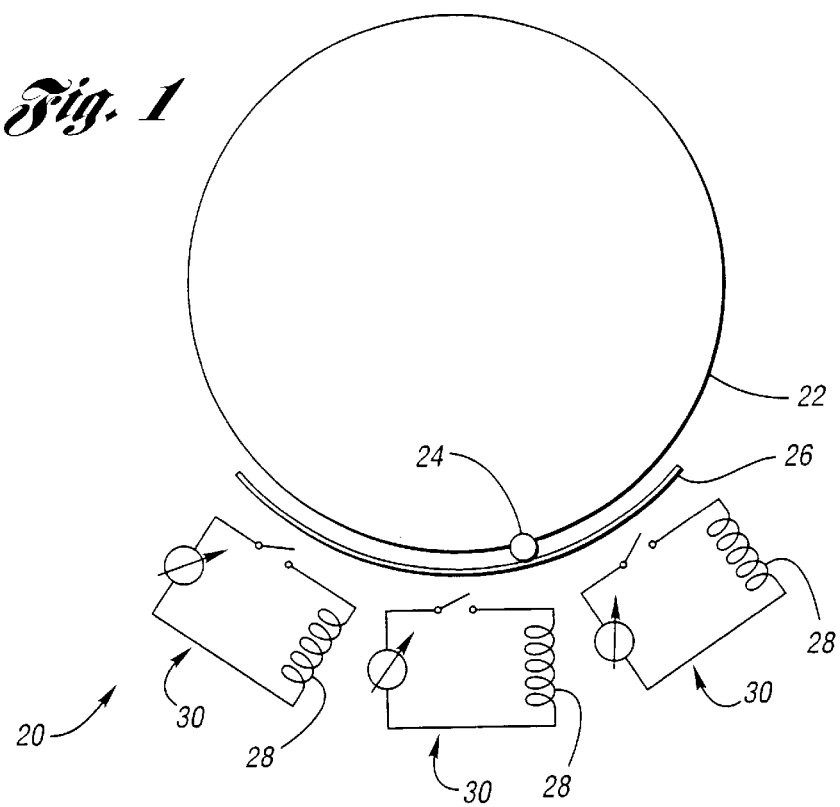
FIG. 1 is a schematic diagram illustrating magnetic actuation applied to a curved actuation surface to accomplish rotational motion according to an embodiment of the present invention.

Referring to FIG. 1, a schematic diagram illustrating magnetic actuation applied to a curved actuation surface to accomplish rotational motion according to an embodiment of the present invention is shown. A magnetic actuation system, shown generally by 20, includes curved surface 22 to which is affixed at least one magnetic positioner 24. Magnetic positioner 24 may be any device or material that creates a mechanical force or motion the presence of a magnetic field such as permanent magnets, electromagnets, or a magnetically attracted material such as iron.

Magnetic actuation system 20 also includes actuation surface 26. Surfaces 22, 26 are arranged such that one may be moved relative to the other, such as by sliding or rotation. Surfaces 22, 26 may be in direct contact or may be separated by a fluid, film, sheet, laminate, or the like. Actuation surface 26 includes a plurality of electromagnetic coils 28. These coils may be energized by circuits, shown generally by 30, to create magnetic fields that interact with one or more magnetic positioners 24. This interaction moves curved surface 22 relative to actuation surface 26. Thus, objects fixed to either curved surface 22 or actuation surface 26 may be aimed or positioned relative to the other surface 26, 22, respectively.

Magnetic positioner 24 can be attracted or repelled from each coil 28 depending on the magnitude and polarity of current through coil 28. Movement of magnetic positioner 24 can be carried out in a stepping motion, where coils 28 along a path of desired trajectory are actuated sequentially.

Actuation surface 26 may be flat or curved. A flat actuation surface 26 allows for translational or planar motion as well as for rotational motion between surfaces 22, 26. A curved activation surface 26 is more restricted to rotational motion, but permits easier implementation of multiple degrees of rotation. For example, actuation surface 26 may be part of a spherical cavity or socket lined with an array of electromagnetic coils 28. A permanent magnet, used to implement magnetic positioner 24, is affixed to curved surface 22 of a sphere inserted in the socket. The changing magnetic field rotates the sphere inside the socket. What is more, the mechanism adds additional degrees of freedom. The resulting structure is capable of more than simple pan and tilt movements and any arbitrary aiming trajectory can be defined. In fact, using the mechanism for the actuation of an artificial eye socket, it is possible to emulate all known types of human eye movements.

Figure 2:
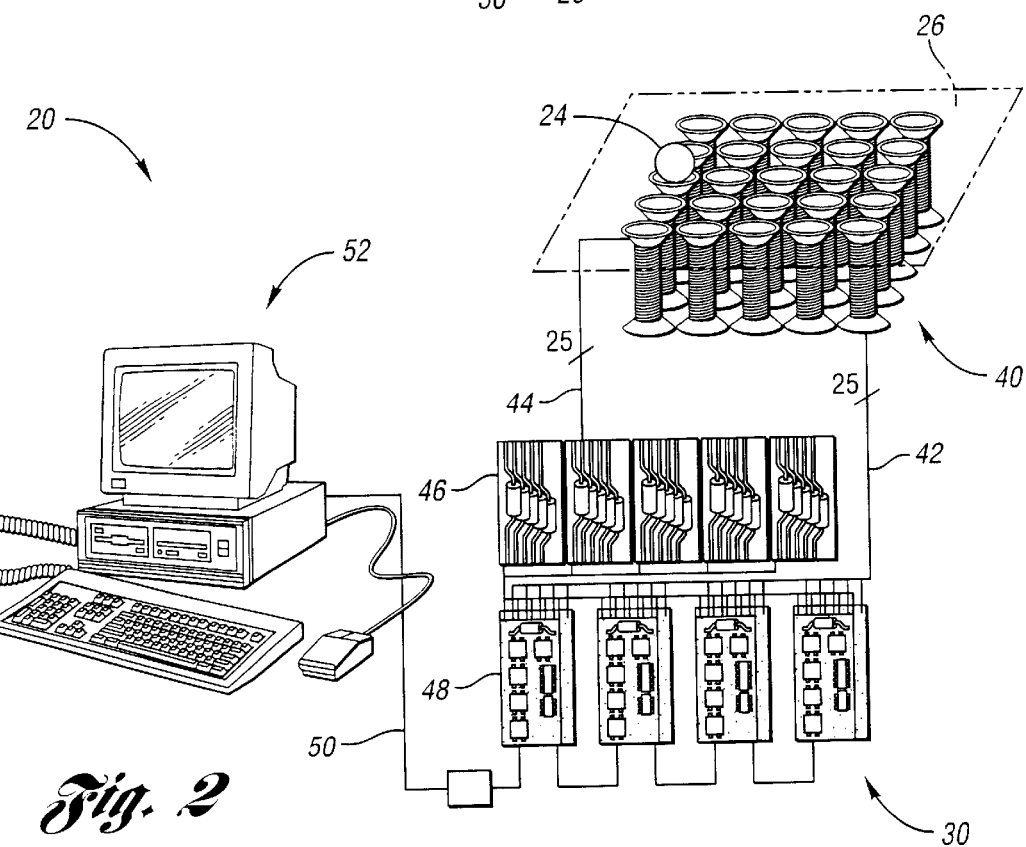
FIG. 2 is a schematic diagram illustrating magnetic actuation according to an embodiment of the present invention.

Referring now to FIG. 2, a schematic diagram illustrating magnetic actuation according to an embodiment of the present invention is shown. A portion of magnetic actuation system 20 is shown with actuation surface 26 supporting a grid of coils, shown generally by 40, arranged in a five-by-five, two-dimensional array of coils 28. Each coil 28 in array 40 has one end connected to ground (GND) wire 42 and a second wire 44 connected to a resistor, shown on resistor boards 46. Resistors and ground wires 42 connect to switchable drivers 48. Switchable drivers 48 may implement on-off switching, may control the magnitude of current or voltage supplied to coils 28, may control the polarity of current or voltage supplied to coils 28, or any combination. The construction of electronic circuits for supplying power to coils 28 is well known in the art. Serial link 50 supplies switchable drivers 48 with control commands from computer 52.

Motion between surfaces 22, 26 occurs due to attraction or repulsion of magnetic positioner 24 from one coil 28 to another coil 28. During the process of magnetic actuation, some of coils 28 will be inactive. The active coils 28, however, conduct a current causing a magnetic field in a certain direction. Magnetic positioner 24 is attracted to or repelled from each coil 28 based on the polarity of a magnetic field produced by coil 28. Thus, to move magnetic positioner 24 to a specific location, each coil 28 in the route to the desired location may be switched on and off in a stepping motion. For example, a certain pattern of logical zeros (selecting GND) and ones (selecting power supply voltage through a resister) can define a desired trajectory for magnetic positioner 24 about array of coils 40. This may be accomplished, for example, through the use of software executing on computer 52.

In an embodiment of the present invention, sensors in activation surface 26 detect movement of curved surface 22 relative to activation surface 26. These sensors may be any type of motion sensors. Preferably, motion is detected by at least one magnetic positioner 24 moving past coil 28. Such motion induces a voltage in coil 28, which may be sensed by circuitry associated with switchable drivers 48. These voltages produce position signals which are relayed to computer 52. Computer 52 then learns the trajectory of curved surface 22 relative to activation surface 26. This trajectory may be replayed by computer 52, allowing magnetic actuation system 20 to be manually taught one or more movements.

Figure 3:
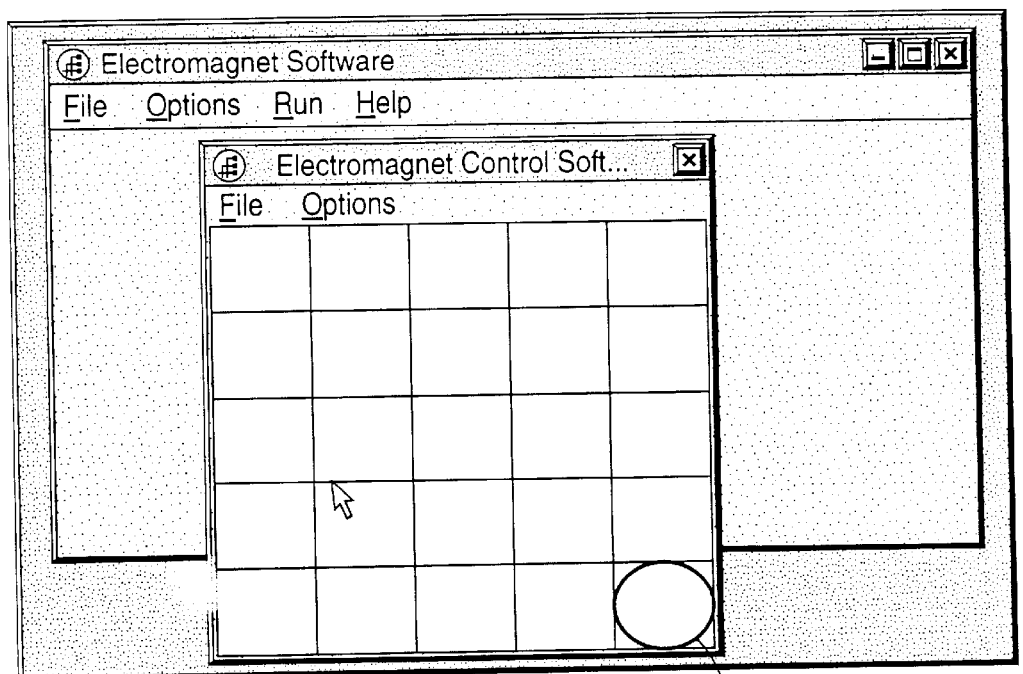
FIG. 3 is a screen captured during execution of software used to control a magnetically actuated positioner according to an embodiment of the present invention.

Referring now to FIG. 3, a screen captured during execution of interactive software used to control a magnetically actuated positioner according to an embodiment of the present invention is shown. Coil grid 40 is represented by computer 52 as a five-by-five table of squares, shown generally by 60. Magnetic positioner 24 is represented by computer 52 as circle 62 in the bottom right hand corner square. Each square in display grid 60 represents a possible new location for magnetic positioner 24. Given the initial starting point of magnetic positioner 24, a user or control program may select a new destination for magnetic positioner 24 by selecting any of the available squares in display grid 60.

In one embodiment, computer 52 calculates a Manhattan geometry path between the current location of magnetic positioner 24 and the desired location for magnetic positioner 24. One aspect of this calculation is versatility. After a destination point for magnetic positioner 24 is specified, there are many trajectories that can be taken. These can be accommodated in a direct manner. In a simplified system, a Manhattan geometry path is taken unless a diagonal path is available.

Figure 4:
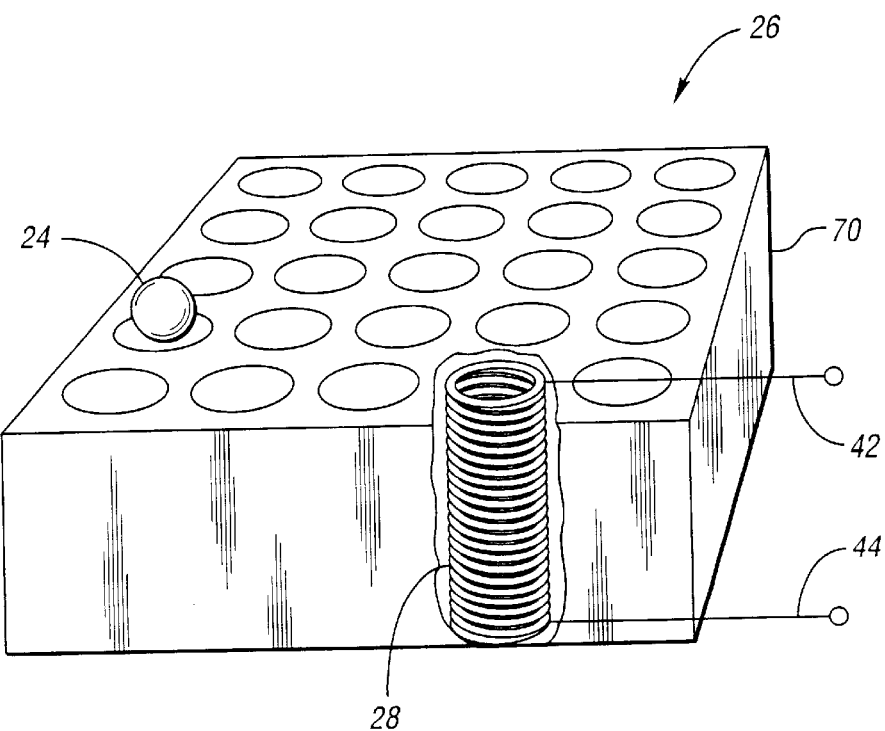
FIG. 4 illustrates an actuation surface according to an embodiment of the present invention.

Referring now to FIG. 4, an illustration of an actuation surface according to an embodiment of the present invention is shown. Coils 28 are embedded in insulative material 70 such as, for example, polytetraflouoroethylene, polyvinylidine fluoride, polyethylene, chlorinated polyethylene, polypropylene and other polyolefins, polyamides, and the like. If actuation surface 26 is curved, insulative material 70 may be molded as a curved surface or made as a flat sheet and formed as desired.

Figure 5:
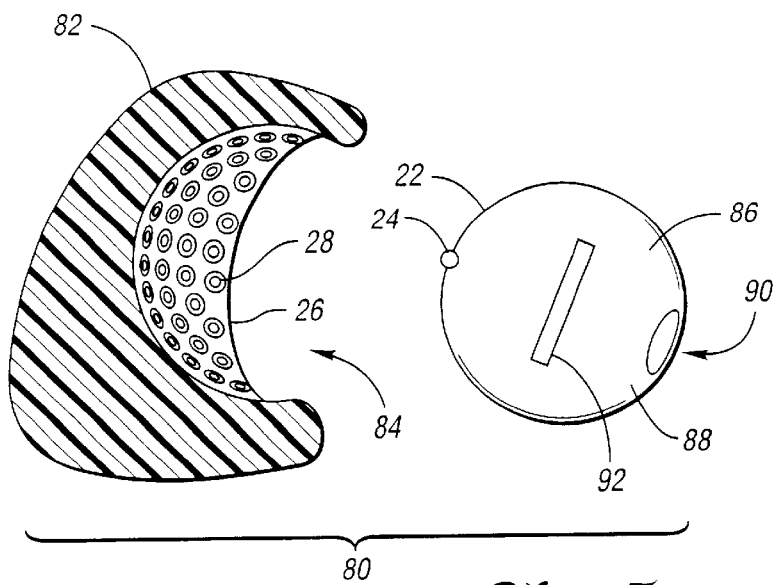
FIG. 5 is an exploded view drawing illustrating a camera according to an embodiment of the present invention.

Referring now to FIG. 5, an exploded view drawing illustrating a camera according to an embodiment of the present invention is shown. Camera 80 includes socket 82 having a cavity, shown generally by 84, lined with actuation surface 26 having a plurality of coils 28. Camera 80 also includes housing 86 having curved surface 22 and aperture surface 88. Aperture surface 88 defines aperture 90 which admits light into housing 86. Aperture 90 may include a light modifying device such as a lens, an iris, and the like. Imaging array 92 is positioned within housing 86 to receive light entering through aperture 90. At least one magnetic positioner 24 is disposed within housing 86 at curved surface 22. Housing 86 is inserted in socket 82 such that housing 86 is rotatively movable relative to housing 86.

Referring now to FIGS. 6a–6d and 7a–7d, operation of a camera according to an embodiment of the present invention is shown. Each of FIGS. 7a–7d illustrate the relative position of magnetic positioner 24 on actuation surface 26 to produce the aiming of camera 80 shown in corresponding FIG. 6a–6d. Actuation surface 26 in each FIGS. 7a–7d is shown flattened for ease of illustration.

Figure 6A:
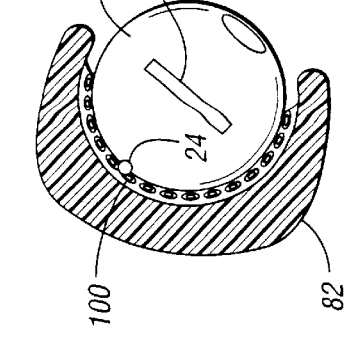
FIGS. 6a–6d are drawings illustrating operation of a camera according to an embodiment of the present invention.
Figure 6B:
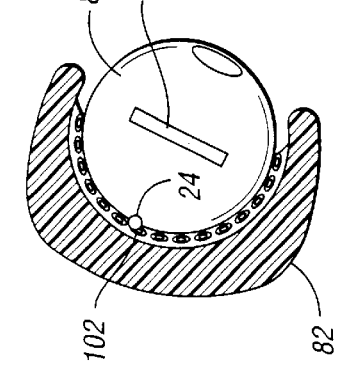
Figure 6C:
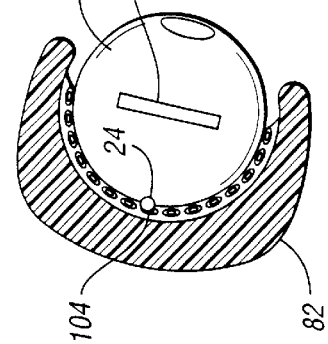
Figure 6D:
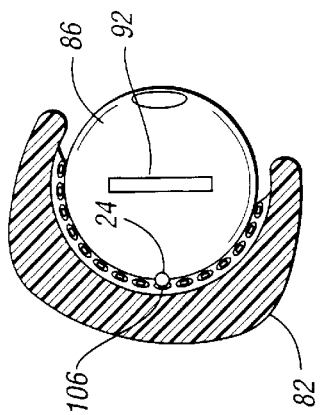
Figure 7A:
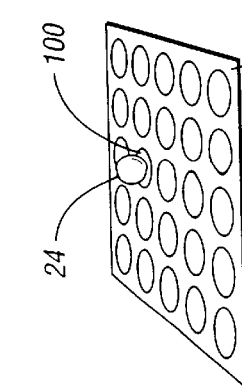
FIGS. 7a–7d are schematic drawings illustrating interaction between electromagnets and a magnetic positioner to produce corresponding positionings in FIGS. 6a–6d according to an embodiment of the present invention.
Figure 7B:
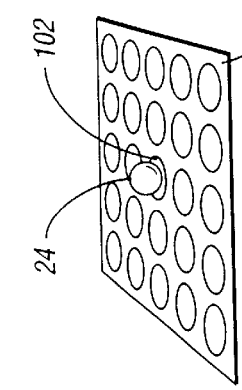
Figure 7C:
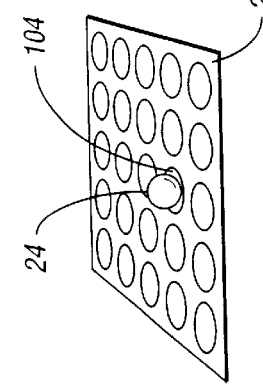
Figure 7D:
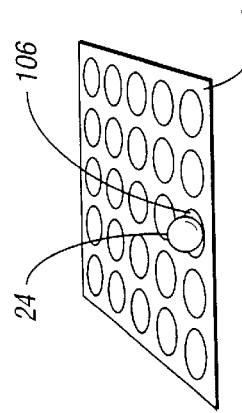

In FIGS. 6a and 7a, first attracting coil 100 is switched on, holding magnetic positioner 24 at first attracting coil 100. In FIGS. 6b and 7b, second attracting coil 102 is switched on, moving magnetic positioner 24 and changing the aim of imaging array 82 within housing 86. First attracting coil 100 may be switched off or may be switched to repel magnetic positioner 24. In FIGS. 6c and 7c, third attracting coil 104 is on, further moving magnetic positioner 24 and rotating housing 86. In FIGS. 6d and 7d, fourth attracting coil 106 is on, still further moving magnetic positioner 24 and rotating housing 86.

Figure 8:
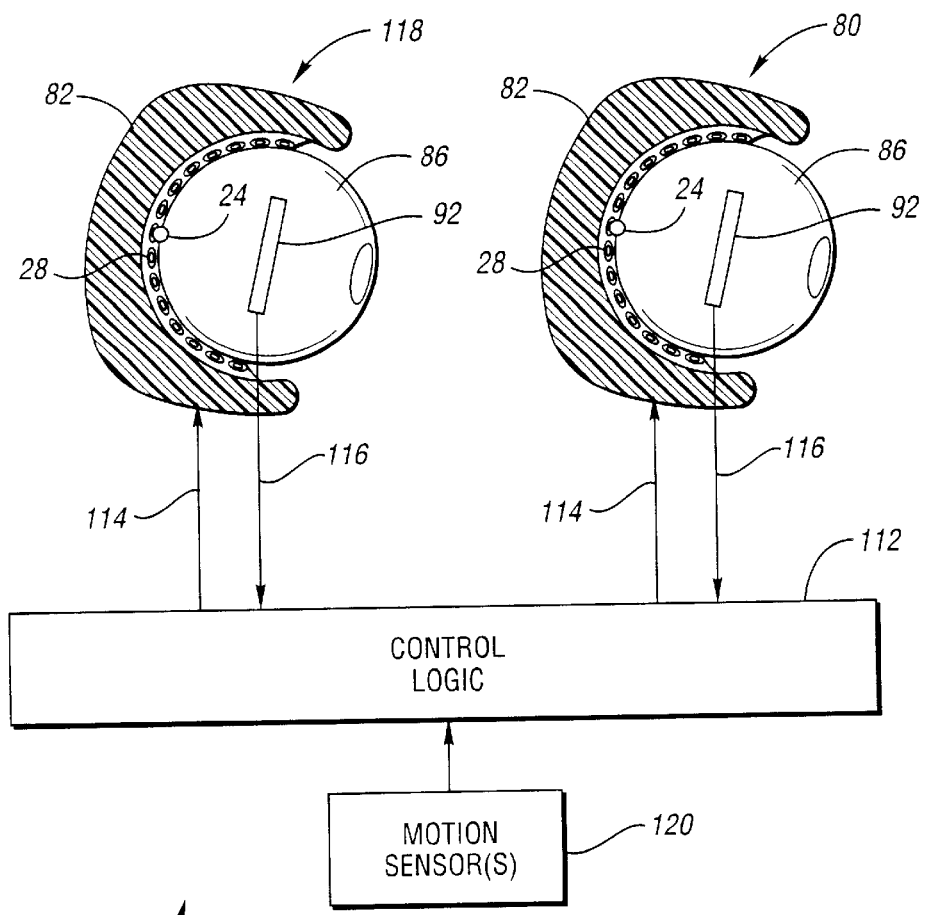
FIG. 8 is a block diagram of a magnetically aimed camera system according to an embodiment of the present invention.

Referring now to FIG. 8, a block diagram of a magnetically aimed camera system according to an embodiment of the present invention is shown. A camera system, shown generally by 110, includes magnetically actuated camera 80 and control logic 112. Control logic 112 generates control signals 114. Control signals 114 energize electromagnets 28 in socket 82 to create interaction with at least one magnetic positioner 24 in housing 86 to rotate and position housing 86 relative to socket 82. This aims the field of view of imaging array 92. Control logic 112 may base control signals 114 on image signals 116 received from imaging array 92. Control logic 112 may receive inputs from additional sources. One such source is second camera 118 which may be, for example, another magnetically actuated camera aimed by control logic 112. Another such source is one or more motion sensors 120. Control logic 112 may be implemented in a variety of means such as, for example, computer 52, custom logic, discrete electronic components, software, firmware, any combination of these, or the like. Control logic 112 may be distributed, with portions implemented within housing 86.

The actuated object in this embodiment is camera 80, 118, creating a device that can be controlled to operate like an eyeball. Magnetic actuation permits the eyeball to implement an arbitrary trajectory. Such a system 110 can reproduce all known types of movements of the human eye, including vestibulo-ocular movements holding an image steady on the retina during brief head movements; optokinetic movements holding an image during sustained head movements; saccadic movements shifting the fovea, or center of vision, rapidly to a target; pursuit movements keeping the image of a moving target on the fovea; and vergence movements moving each of a pair of eyes in opposite directions to position an image on the foveae. Mimicking these types of movements have many applications in virtual reality; augmented reality; pan, tilt and other actuation mechanisms for cameras and camcorders; man-machine interfaces; and the like.

The vestibular system provides a sixth sense of balance in humans. The vestibular system is linked to ocular muscles to compensate for brief jerky movements of the head, such as the ones experienced when going over a pebble while riding a bicycle. When coupled with inertial or motion sensors 120, control logic 112 can be used to move imaging sensor 92 in response to or to compensate for brief jerky or vibrating movements of the platform upon which camera 80 is mounted. Such control makes observation of scenes through moving camera 80 more tolerable. For example, an operator or observer of a scene provided from a moving camera 80 would suffer less from vertigo or nausea as a result of watching through artificial eyes.

Optokinetic movement compensates for sustained movements of the camera platform. Optokinetic movement can also be compensated or corrected using a magnetic actuation mechanism of the present invention. As in vestibular correction, one or more motion sensors 120 may provide input for optokinetic correction. Also, it may be useful to have advance notice of gross movements such as, for example, from a navigational system. Since optokinetic movements of the magnetic actuation system are in response to sustained movements, data required to generate the specific pattern of pulses to be communicated to the magnetic actuation mechanism could come from visual sensor 92 embedded in housing 86.

Saccadic eye movements bring new objects of interest to the fovea of the eye, which has the highest concentration of color sensitive light sensors, or cones, in the back of the eye. Saccadic eye movements are to objects that are in the field of view, but not in the field of view of the fovea. This applies specifically to an eye with a variable resolution, such as the human eye, which samples objects in the center at a high resolution than objects around the periphery. Imaging array 92 may be constructed with nonhomogeneous sensing capabilities. For example, imaging array 92 may be equipped with additional circuits, resulting in positioning light sensors in a certain high resolution area. Also, imaging array 92 may be equipped with multiple types of sensors that respond to different frequencies of the electromagnetic spectrum. Thus, there may be a need to position different types of sensors at different resolutions across the sensory grid. Additionally, creating human-like visual sensing and perception will likely require a multiresolution camera or camera-like sensor. Saccadic eye movements would be useful in all three of these cases. Yet another application of saccadic eye movements applies to uniform resolution cameras in shifting the depth and focus of the attention.

Pursuit movements may be calculated in response to the visual information provided from imaging array 92. An example scenario is a videoconferencing system which allows conference participants to move around while being tracked by camera 80. In another scenario, a magnetic actuation mechanism programmed with pursuit movements may be used to make recordings of moving subjects without the need for a camera operator to position camera 80 in response to the movements of the subjects.

Vergence movements involve two or more cameras 80, 118. Vergence movements play a role in judging the depth of objects in the visual field. Typically, vergence movements focus two eyes on a target until there is no horizontal disparity in the image of the object between the eyes. This allows for minute corrections in the performance of a task. Thus, vergence movements of cameras 80, 118 may be used in guiding robots in unstructured settings. Another application is in visual man-machine interfaces that detect and follow subtle visual differences in the direction of the gaze of a human operator. Saccadic movements may be added onto vergence movements to shift the attention between different depth planes.

Figure 9:
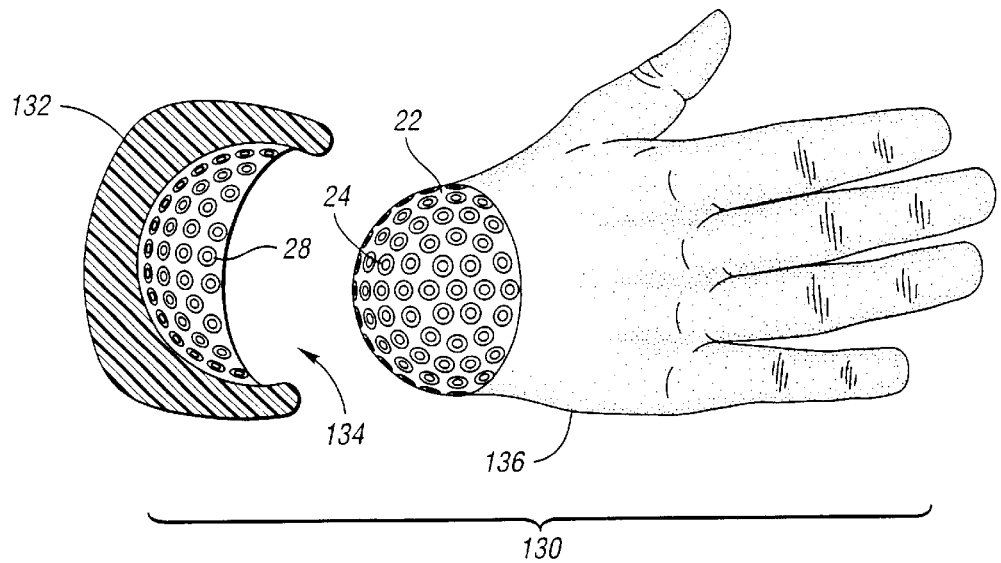
FIG. 9 is an exploded view drawing illustrating magnetic actuation for control of robotic manipulator movement according to an embodiment of the present invention.

Referring now to FIG. 9, an exploded view drawing illustrating magnetic actuation for control of robotic manipulator movement according to an embodiment of the present invention is shown. A robotic joint, shown generally by 130, includes socket 132 having a cavity, shown generally by 134, accepting robotic manipulator 136. Activation surface 26 within cavity 134 supports a plurality of electromagnetic coils 28. Manipulator 136 includes curved surface 22 having a plurality of magnetic positioners 24. As described above, electromagnetic coils 28 are energized to attract or repel magnetic positioners 24, thereby moving manipulator 136 relative to socket 132. By using a plurality of magnetic positioners 24 and coils 28, manipulator 136 may be moved through all three rotational degrees of freedom. A wide variety of joints may be constructed in this manner, including ball and socket joints, pivot joints, hinge joints, gliding joints, saddle joints, and the like.

Figure 10:
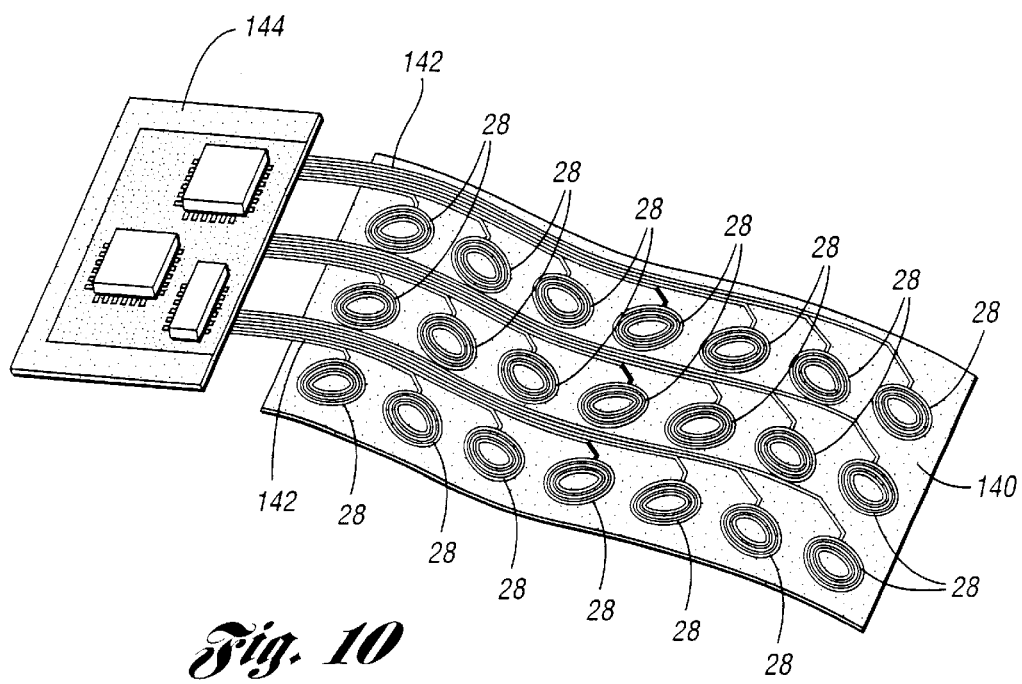
FIG. 10 is a schematic drawing illustrating a flexible circuit board with multiple addressable coils according to an embodiment of the present invention.

Referring now to FIG. 10, a schematic drawing illustrating a flexible circuit board with multiple addressable coils according to an embodiment of the present invention is shown. Magnetic coils 28 can be embedded into flexible circuit board 140. Since a flexible material is used, flexible circuit board 140 may be formed into a wide variety of surfaces for use as either or both of curved surface 22 and actuation surface 26. One example of such a flexible material is Novaflex® from Sheldahl, Inc. of Northfield, Minn. Flexible traces 142 on flexible circuit board 140 connect coils 28 with printed circuit board 144 which may contain drive electronics, sensing electronics, control logic, and the like.

Figure 11:
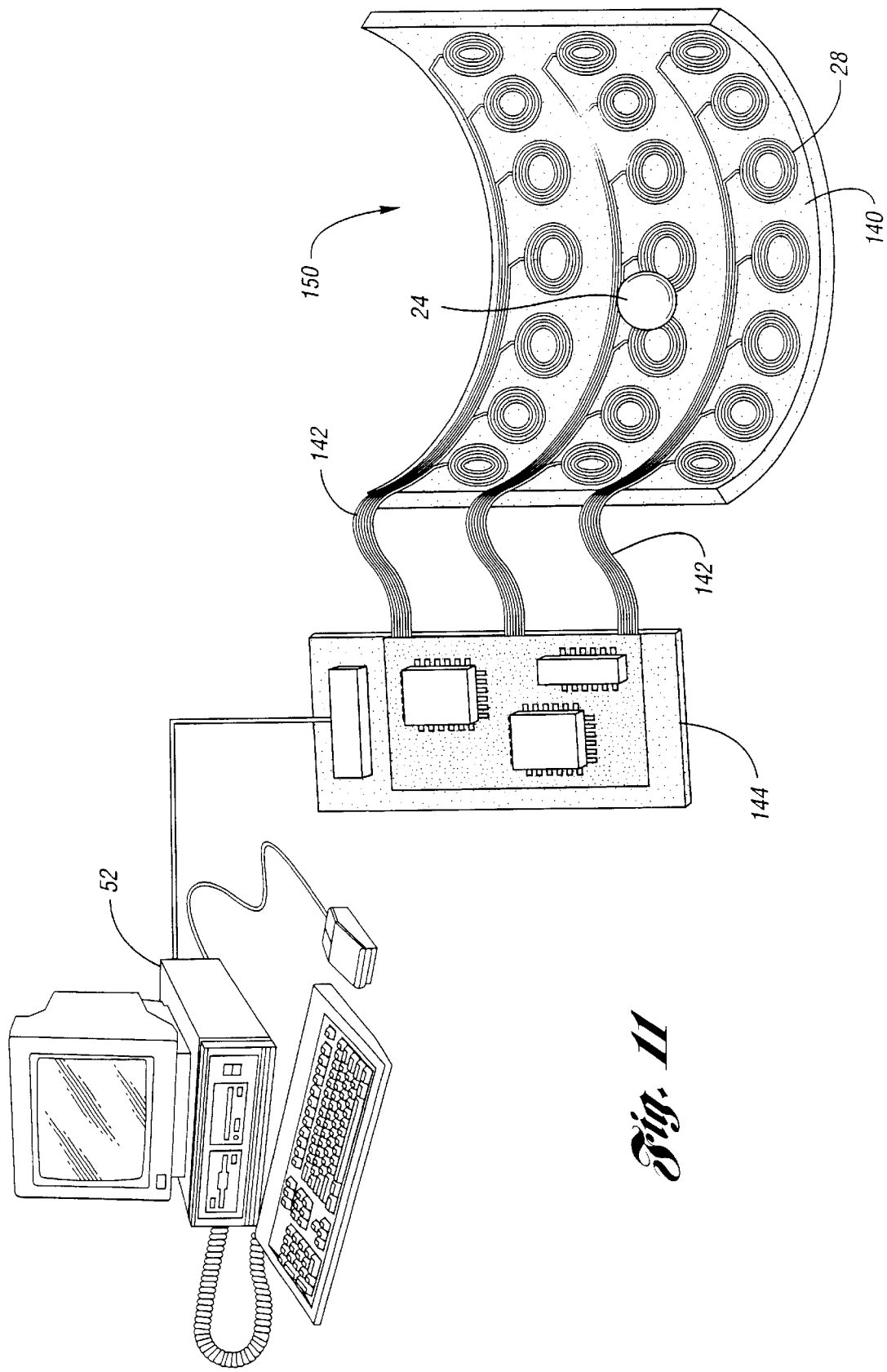
FIG. 11 is a schematic drawing illustrating a flexible circuit board with embedded controllable electromagnets arranged on a curved surface according to an embodiment of the present invention.

Referring now to FIG. 11, a schematic drawing illustrating a flexible circuit board with embedded controllable electromagnets arranged on a curved surface according to an embodiment of the present invention is shown. An array of coils 28 is embedded onto flexible circuit board 140, which is then fit into a cylindrical cavity or socket, shown generally by 150. Rigid circuit board 144 is used to activate each coil 28 in the array. Based on which coil 28, or group of coils 28, are activated, the displacement of magnetic positioner 24 can be controlled. Controlling signals are sent to addressable rigid circuit board 144 from computer 52.

Figure 12:
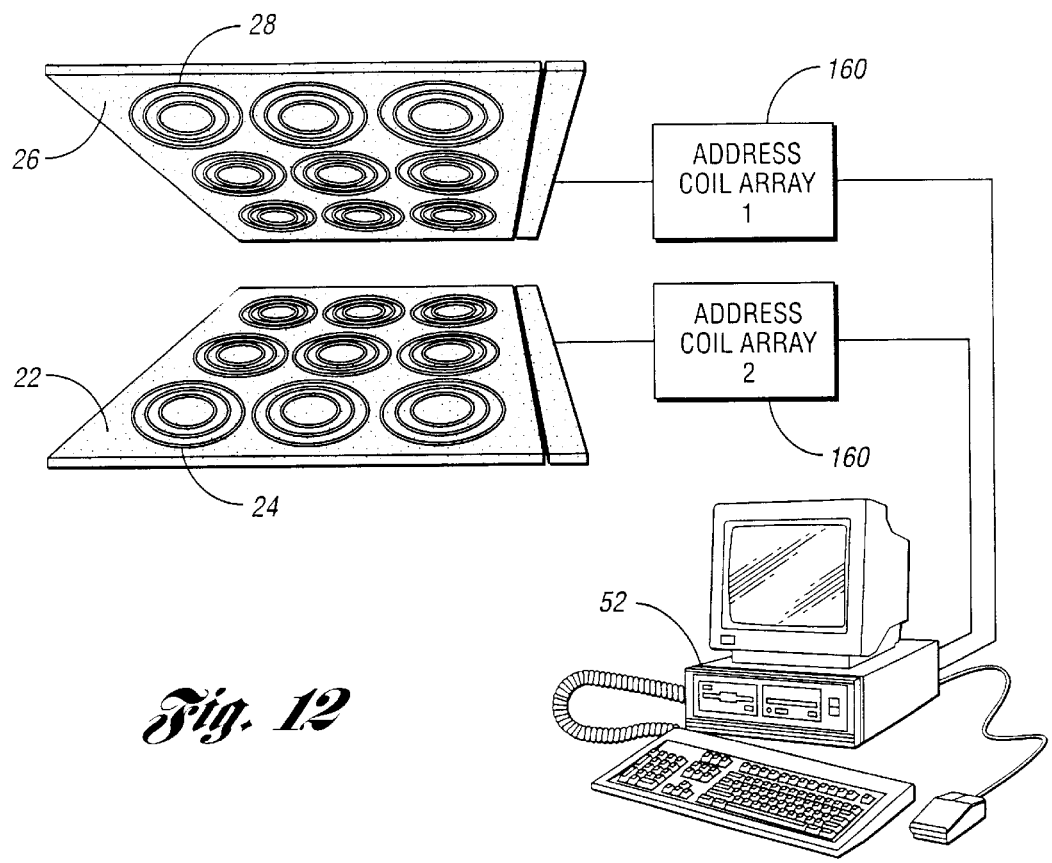
FIG. 12 is a schematic diagram illustrating a system having two electromagnetic coil surfaces according to an embodiment of the present invention.

Referring now to FIG. 12, a schematic diagram illustrating a system having two electromagnetic coil surfaces according to an embodiment of the present invention is shown. Activation surface 26 includes electromagnetic coils 28. Curved surface 22 also includes electromagnetic coils functioning as magnetic positioners 24. Each set of coils 24, 28 are energized from addressable drivers 160 controlled by computer 52. This approach has several advantages. First less current is needed in each electromagnet 28 since a whole surface is used. Second, the position of one surface in relation to the other may be reset with greater ease. Control logic 52 may be modified to take into consideration both surfaces 22, 26, thus creating greater flexibility for creating attractive and repulsive forces. Typically, separate activation sequences would be sent out to each set of drivers 160 for each surface 22, 26.

Figure 13:
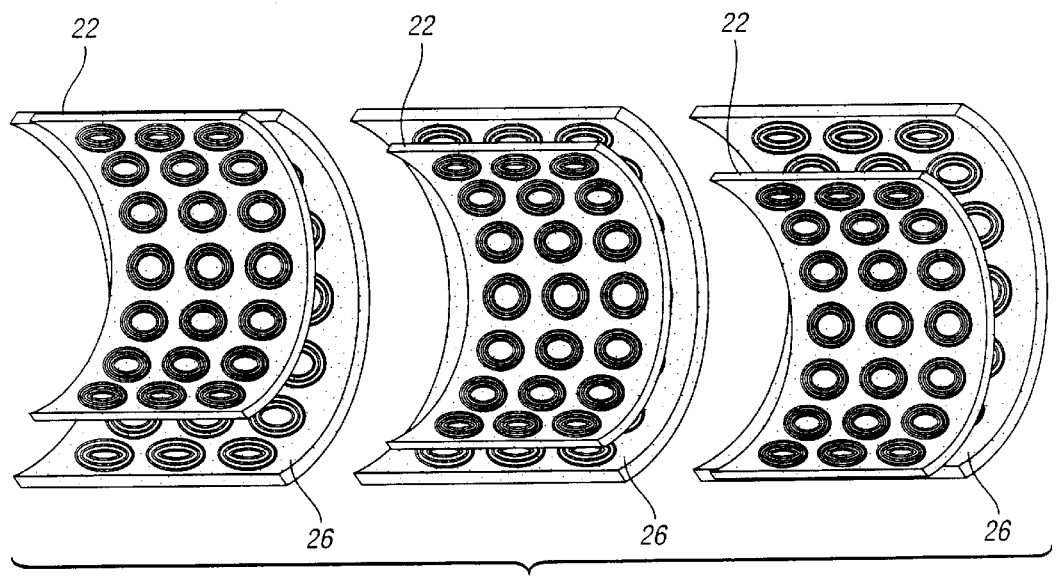
FIG. 13 is an illustration of magnetic positioning based on the movement of two electromagnetic coil surfaces according to an embodiment of the present invention.

Referring now to FIG. 13, an illustration of magnetic positioning based on the movement of two electromagnetic coil surfaces according to an embodiment of the present invention is shown. Surfaces 22, 26 may be formed into a variety of shapes. Further, the shape of curved surface 22 need not correspond with the shape of actuation surface 26. By appropriately controlling current to coils 28 and magnetic positioners 24, curved surface 22 can be made to slide across and rotate relative to actuation surface 26 to create highly customized aiming and positioning patterns.

While embodiments of the invention have been illustrated and described, it is not intended that these embodiments illustrate and describe all possible forms of the invention. The present invention may be used to aim or position a wide variety of objects. Embodiments described herein include several for aiming a camera, but one of ordinary skill in the art will recognize that any type of transducer may be aimed by the present invention including, for example, microphones, photodetectors, radiation detectors, antennas, and the like. Energy transmitting transducers, such as light and sound sources, may also be used. The present invention may also be employed to aim or position a wide variety of tools or workpieces. Thus, the words used in the specification are words of description rather than limitation, and it is understood that various changes may be made without departing from the spirit and scope of the invention.

What is claimed is:

1. A magnetically aimed camera comprising:
   a housing having a curved surface and an aperture surface, the aperture surface defining an aperture;
   an imaging array disposed within the housing, the imaging array receiving light through the aperture;
   at least one magnetic positioner disposed within the housing at the curved surface;
   a socket receiving the housing, the housing curved surface rotating within the socket; and
   a plurality of controlled electromagnets disposed within the socket.

2. A magnetically aimed camera as in claim 1 wherein at least one magnetic positioner comprises an electromagnet.

3. A magnetically aimed camera as in claim 1 wherein at least one magnetic positioner comprises a permanent magnet.

4. A magnetically aimed camera as in claim 1 wherein at least one magnetic positioner comprises a magnetically attracted material.

5. A magnetically aimed camera as in claim 1 wherein the plurality of controlled electromagnets are built on a flexible printed circuit.

6. A magnetically aimed camera as in claim 1 wherein at least one magnetic positioner is built on a flexible printed circuit.

7. A magnetically aimed camera as in claim 1, further comprising control logic in communication with the plurality of controlled electromagnets, the control logic energizing at least one of the controlled electromagnets to create magnetic interaction with at least one magnetic positioner, thereby rotating the housing relative to the socket.

8. A magnetically aimed camera as in claim 7, wherein the control logic is in communication with the imaging array, the control logic rotating the housing relative to the socket based on signals from the imaging array.

9. A magnetically aimed camera as in claim 7 further comprising a motion sensor in communication with the control logic, the control logic rotating the housing relative to the socket in response to signals from the motion sensor.

10. A magnetically aimed camera as in claim 7 further comprising at least one additional aimed camera in communication with the control logic, the control logic determining vergence movements based on input from the at least one additional aimed camera.

11. A magnetically aimed camera as in claim 7, wherein the control logic implements vestibulo-ocular movements.

12. A magnetically aimed camera as in claim 7, wherein the control logic implements optokinetic movements.

13. A magnetically aimed camera as in claim 7, wherein the control logic implements saccadic movements.

14. A magnetically aimed camera as in claim 7, wherein the control logic implements pursuit movements.

15. A magnetically aimed transducer comprising:
    a housing having a curved surface, the housing holding the transducer;
    at least one magnetic positioner disposed within the housing at the curved surface;
    a socket receiving the housing, the housing curved surface rotating within the socket, the housing positioned in the socket such that the transducer is aimable through an opening in the socket; and
    a plurality of controlled electromagnets disposed within the socket, each controlled electromagnet controllable to magnetically interact with the at least one magnetic positioner to rotate the housing within the socket, thereby aiming the transducer.

* * * * *